United States Patent
Singh et al.

(10) Patent No.: US 12,236,236 B2
(45) Date of Patent: *Feb. 25, 2025

(54) SYSTEM FOR DETECTION AND RECORDATION OF FUNCTIONAL CODE LOGIC COMPONENTS ON A DISTRIBUTED DEVELOPMENT PLATFORM

(71) Applicant: BANK OF AMERICA CORPORATION, Charlotte, NC (US)

(72) Inventors: Shailendra Singh, Maharashtra (IN); Kamlesh Kanayalal Gangaramani, Maharashtra (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/611,774

(22) Filed: Mar. 21, 2024

(65) Prior Publication Data

US 2024/0231818 A1     Jul. 11, 2024

Related U.S. Application Data

(63) Continuation of application No. 17/577,455, filed on Jan. 18, 2022, now Pat. No. 11,983,529.

(51) Int. Cl.
  *G06F 8/77* (2018.01)
  *G06F 16/23* (2019.01)
  *G06F 21/62* (2013.01)
  *G06Q 20/02* (2012.01)

(52) U.S. Cl.
  CPC ............ *G06F 8/77* (2013.01); *G06F 16/2379* (2019.01); *G06F 21/6209* (2013.01); *G06Q 20/02* (2013.01)

(58) Field of Classification Search
  CPC  G06F 8/77; G06F 16/23; G06F 21/62; G06Q 20/02

See application file for complete search history.

(56) References Cited

U.S. PATENT DOCUMENTS

| | | |
|---|---|---|
| 7,487,123 B1 | 2/2009 | Keiser et al. |
| 7,778,915 B2 | 8/2010 | Angle et al. |
| 7,895,112 B2 | 2/2011 | Richmann et al. |
| 7,921,051 B2 | 4/2011 | Serkin et al. |
| 7,933,827 B2 | 4/2011 | Richmann et al. |
| 7,974,907 B2 | 7/2011 | Miller et al. |
| 8,132,005 B2 | 3/2012 | Tarkkala et al. |
| 8,190,893 B2 | 5/2012 | Benson et al. |

(Continued)

*Primary Examiner* — Scott S Trotter
(74) *Attorney, Agent, or Firm* — Moore & Van Allen PLLC; Anup Iyer

(57) ABSTRACT

Systems, computer program products, and methods are described herein for detection and recordation of functional code logic components on a distributed development platform. The present invention is configured to retrieve, from a source code repository, a source code script, wherein the source code script is associated with a first source; initiate a machine learning model on the source code script; determine, using the machine learning model, at least one functional code logic component from the source code script; initiate an NFT source code mapping engine on the at least one functional code logic component; generate, using the NFT source code mapping engine, a NFT for the at least one functional code logic component, wherein the NFT comprises the at least one functional code logic component and information associated with the first source; and record the NFT in a distributed ledger.

20 Claims, 3 Drawing Sheets

(56) References Cited

U.S. PATENT DOCUMENTS

| | | |
|---|---|---|
| 8,244,622 B2 | 8/2012 | Hughes, Jr. et al. |
| 8,386,362 B2 | 2/2013 | Failla et al. |
| 8,412,952 B1 | 4/2013 | Ramzan et al. |
| 8,606,685 B2 | 12/2013 | Keiser et al. |
| 2010/0228674 A1 | 9/2010 | Ogg et al. |
| 2010/0250447 A1 | 9/2010 | Hughes et al. |
| 2011/0231913 A1 | 9/2011 | Feng et al. |
| 2013/0061049 A1 | 3/2013 | Irvine |
| 2013/0238478 A1 | 9/2013 | Bruno |
| 2013/0238903 A1 | 9/2013 | Mizunuma |
| 2013/0254052 A1 | 9/2013 | Royyuru et al. |
| 2014/0280476 A1 | 9/2014 | Chiussi et al. |
| 2014/0344015 A1 | 11/2014 | Purtolas-Montas et al. |
| 2015/0120567 A1 | 4/2015 | Van Rooyen et al. |
| 2021/0281410 A1 | 9/2021 | Hain |
| 2022/0366494 A1 | 11/2022 | Cella et al. |
| 2023/0143854 A1 | 5/2023 | Venezia |
| 2023/0177628 A1 | 6/2023 | Kim et al. |

SYSTEM FOR DETECTION AND RECORDATION OF FUNCTIONAL CODE LOGIC COMPONENTS ON A DISTRIBUTED DEVELOPMENT PLATFORM

CROSS-REFERENCE TO RELATED APPLICATION

This application is a continuation of and claims priority to U.S. patent application Ser. No. 17/577,455, and now issued as U.S. Pat. No. 11,983,529, filed on Jan. 18, 2022, and of the same title; the contents of which are incorporated herein by reference.

FIELD OF THE INVENTION

The present invention embraces a system for detection and recordation of functional code logic components on a distributed development platform.

BACKGROUND

Software programming is a skilled activity where developers create source code scripts with functional code logic components based on specific requirements on various programming platforms within a distributed development platform (e.g., DevOps platform). As future software development moves to a distributed modality, source code scripts that are hosted on a cloud, are likely to be shared among multiple developers to create modular programs using various functional code logic components. NFT technology can be leveraged to tokenize ownership of functional code logic components in a distributed development platform such that source code scripts may be shared in such a way that the developer's contribution is not only recognized, but also monetized.

Therefore, there is a need for a system for detection and recordation of functional code logic components on a distributed development platform.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for detection and recordation of functional code logic components on a distributed development platform is presented. The system comprising: at least one non-transitory storage device; and at least one processor coupled to the at least one non-transitory storage device, wherein the at least one processor is configured to: retrieve, from a source code repository, a source code script, wherein the source code script is associated with a first user or source; initiate a machine learning model on the source code script; determine, using the machine learning model, at least one functional code logic component from the source code script; initiate an NFT source code mapping engine on the at least one functional code logic component; generate, using the NFT source code mapping engine, a NFT for the at least one functional code logic component, wherein the NFT comprises the at least one functional code logic component and information associated with the first user; and record the NFT in a distributed ledger.

In some embodiments, recording the NFT on the distributed ledger further comprises: generating a new transaction object for the NFT; and deploying the new transaction object on the distributed ledger.

In some embodiments, the at least one processor is further configured to: generate, using the NFT source code mapping engine, a first metadata layer for the NFT; and store the functional code logic component and information associated with the first user in the first metadata layer.

In some embodiments, the at least one processor is further configured to: electronically receive, from a first user input device, the source code script; and store the source code script in the source code repository in response to receiving the source code script.

In some embodiments, the at least one processor is further configured to: transmit control signals configured to cause the first user input device to display the at least one functional code logic component; and in response, electronically receive, from the first user input device, one or more code access conditions associated with the at least one functional code logic component.

In some embodiments, the at least one processor is further configured to: generate, using the NFT source code mapping engine, a second metadata layer for the NFT; and store the one or more code access conditions in the second metadata layer.

In some embodiments, the at least one processor is further configured to: electronically receive, from a second user input device, a request to access the at least one functional code to be integrated into a program; retrieve, from the second metadata layer of the NFT, the one or more code access conditions; and transmit control signals configured to cause the second user input device to display the one or more code access conditions.

In some embodiments, the at least one processor is further configured to: electronically receive, from the second user input device, a second user input acknowledging the one or more code access conditions; retrieve, from a third metadata layer of the NFT, a value of the NFT; automatically retrieve, from an account repository associated with the second user or source, an amount of funds corresponding to the value of the NFT; and in response, authorize the second user input device to access the at least one functional code logic component.

In some embodiments, the at least one processor is further configured to: electronically receive, from the second user input device, a request to generate a containerized NFT for the program; generate, using the NFT source code mapping engine, the containerized NFT for the program, wherein the containerized NFT comprises at least the NFT associated with the at least one functional code logic component; and record the containerized NFT in the distributed ledger.

In another aspect, a computer program product for detection and recordation of functional code logic components on a distributed development platform is presented. The computer program product comprising a non-transitory computer-readable medium comprising code causing a first apparatus to: retrieve, from a source code repository, a source code script, wherein the source code script is associated with a first user; initiate a machine learning model on the source code script; determine, using the machine learning model, at least one functional code logic component from the source code script; initiate an NFT source code mapping engine on the at least one functional code logic component; generate, using the NFT source code mapping engine, a NFT for the at least one functional code logic component, wherein the NFT comprises the at least one functional code logic component and information associated with the first user; and record the NFT in a distributed ledger.

In yet another aspect, a method for detection and recordation of functional code logic components on a distributed development platform is presented. The method comprising: retrieving, from a source code repository, a source code script, wherein the source code script is associated with a first user; initiating a machine learning model on the source code script; determining, using the machine learning model, at least one functional code logic component from the source code script; initiating an NFT source code mapping engine on the at least one functional code logic component; generating, using the NFT source code mapping engine, a NFT for the at least one functional code logic component, wherein the NFT comprises the at least one functional code logic component and information associated with the first user; and recording the NFT in a distributed ledger.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
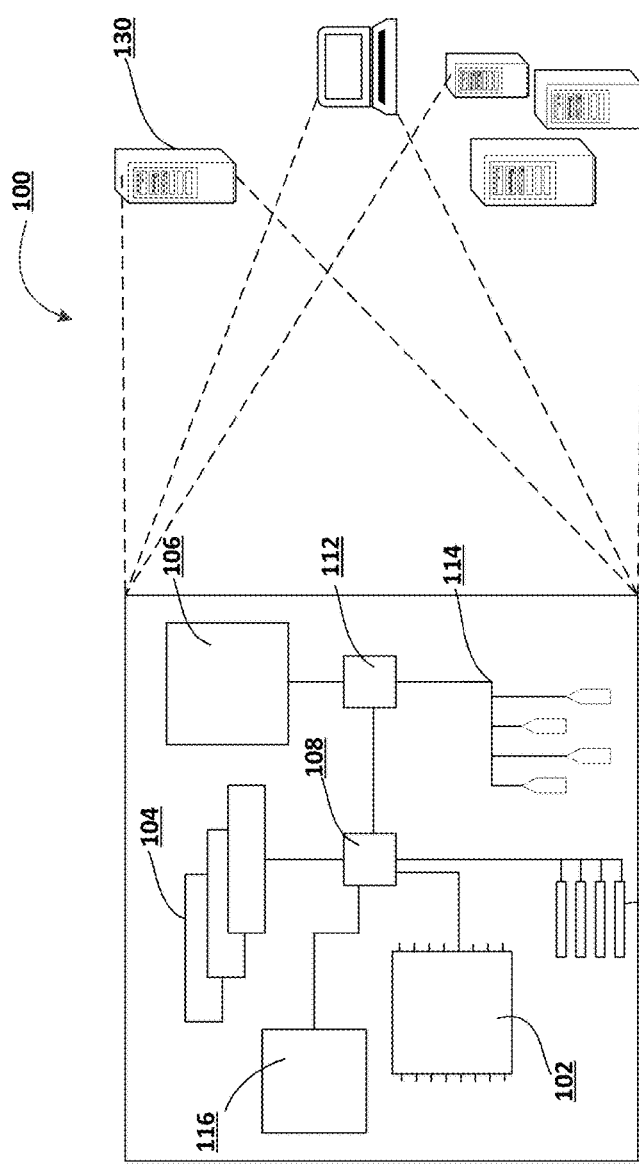
Figure 1:
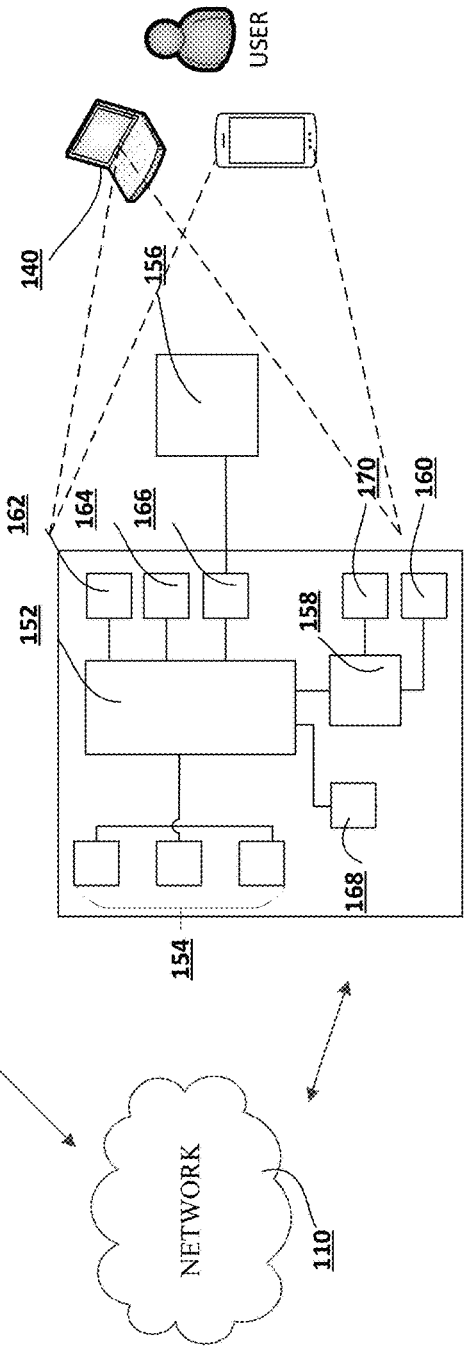
Figure 2:
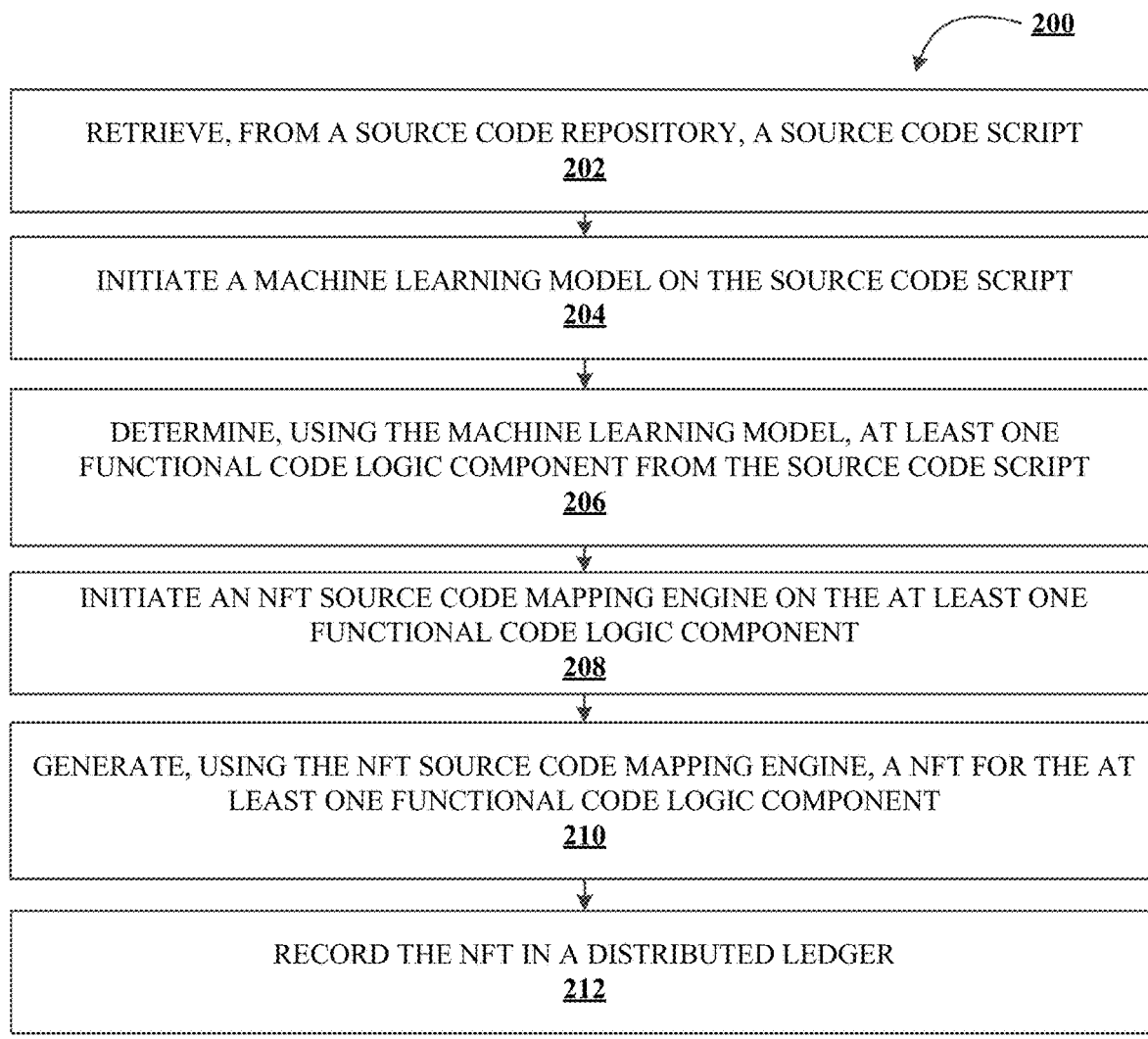
Figure 3:
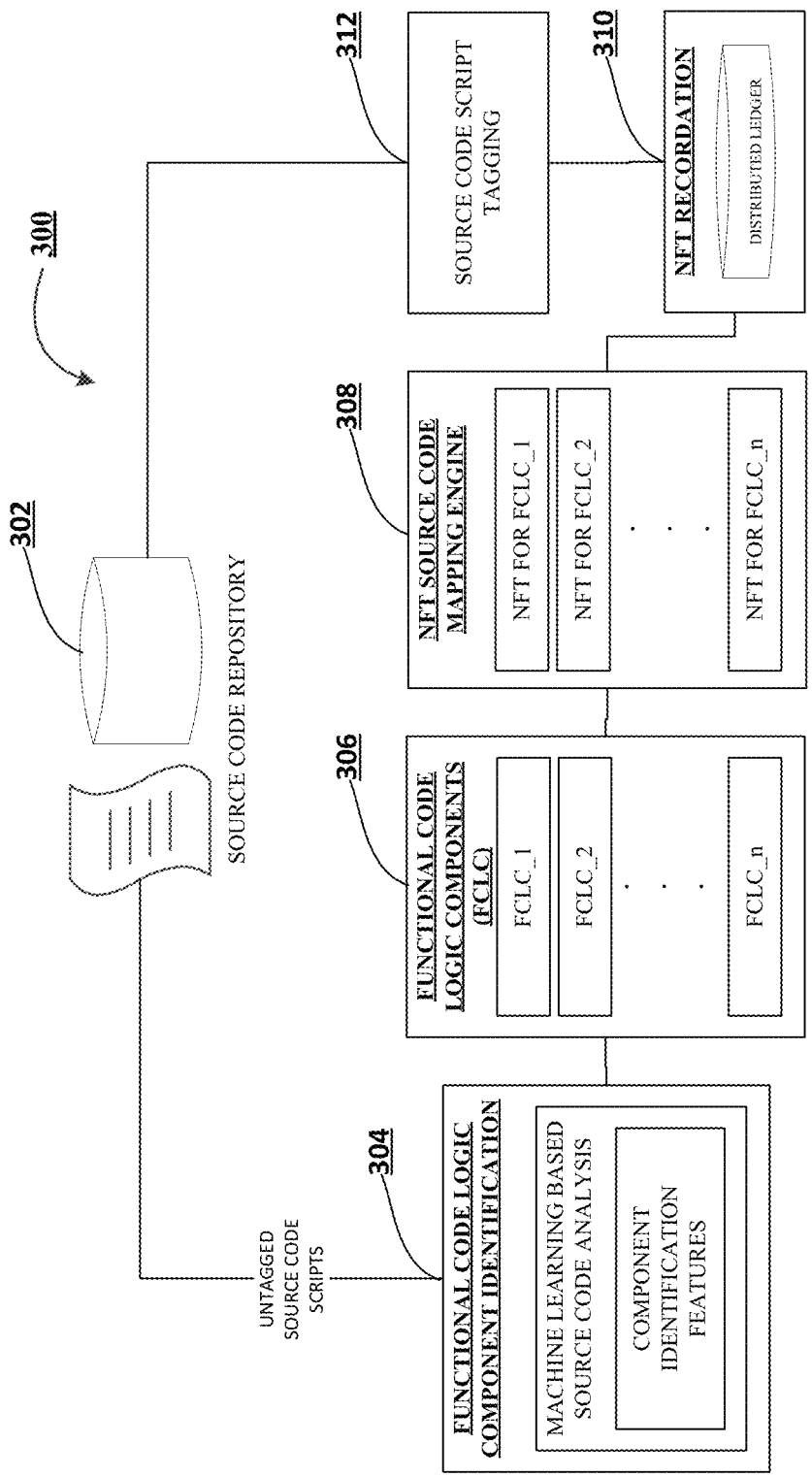

Having thus described embodiments of the invention in general terms, reference will now be made the accompanying drawings, wherein:

FIG. 1 illustrates technical components of a system for detection and recordation of functional code logic components on a distributed development platform, in accordance with an embodiment of the invention;

FIG. 2 illustrates a process flow for detection and recordation of functional code logic components on a distributed development platform, in accordance with an embodiment of the invention; and FIG. 3 illustrates a data flow diagram for detection and recordation of functional code logic components on a distributed development platform, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, a "user" may be an employee (e.g., an associate, a software code developer, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer or a prospective customer. In other embodiments, a user may be a system performing one or more tasks described herein.

As used herein, a "user interface" may be any device or software that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of a computer program, or part of a computer program that serves as a foundation for a larger piece of software and drives the functionality of the software. An engine may be self-contained, but externally-controllable code that encapsulates powerful logic designed to perform or execute a specific type of function. In one aspect, an engine may be underlying source code that establishes file hierarchy, input and output methods, and how a specific part of a computer program interacts or communicates with other software and/or hardware. The specific components of an engine may vary based on the needs of the specific computer program as part of the larger piece of software. In some embodiments, an engine may be configured to retrieve resources created in other computer programs, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, and/or one or more devices, nodes, clusters, or systems within the system environment described herein. For example, an interaction may refer to a transfer of data between devices, an accessing of stored data by one or more nodes of a computing cluster, a transmission of a requested task, or the like.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, a "distributed ledger" may refer to a consensus of replicated and synchronized data geographically shared across multiple nodes on a network. Without using a centralized data storage, each distributed ledger database replicates and saves an identical copy of the ledger. A distributed ledger may employ executing codes, also known as smart contracts, to manage transactions and store records of transactions among disparate participants in the distributed ledger-based network (DLN) without the need for a central authority.

As used herein, a "non-fungible token" or "NFT" may refer to a digital unit of data used as a unique digital identifier for a resource, such as functional code logic components in a source code script. An NFT may be stored on a distributed ledger that certifies ownership and authenticity of the resource, and as such, cannot be copied, substituted, or subdivided. In specific embodiments, the NFT may include at least relationship layer, a token layer, a metadata layer(s), and a licensing layer. The relationship layer may include a map of various users that are associated with the NFT and their relationship to one another. For example, if the NFT is purchased by buyer B1 from a seller S1, the relationship between B1 and S1 as a buyer-seller is recorded in the relationship layer. In another example, if the NFT is owned by O1 and the resource itself is stored in a storage facility by storage provider SP1, then the relationship between O1 and SP1 as owner-file storage provider is recorded in the relationship layer. The token layer may include a smart contract that points to a series of metadata associated with the resource, and provides information about supply, authenticity, lineage, and provenance of the resource. The metadata layer(s) may include resource descriptors that provides information about the resource itself (e.g., resource information). These resource descriptors may be stored in the same metadata layer or grouped into multiple metadata layers. The licensing layer may include any restrictions and licensing rules associated with purchase, sale, and any other types of transfer of the resource from one person to another. Those skilled in the art will appreciate that various additional layers and combinations of layers can be configured as needed without departing from the scope and spirit of the invention.

As used herein, "machine learning algorithms" may refer to programs (math and logic) that are configured to self-adjust and perform better as they are exposed to more data. To this extent, machine learning algorithms are capable of adjusting their own parameters, given feedback on previous performance in making prediction about a dataset. Machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, or the like), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked autoencoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or any suitable form of machine learning algorithm.

As used herein, "machine learning model" may refer to a mathematical model generated by machine learning algorithms based on sample data, known as training data, to make predictions or decisions without being explicitly programmed to do so. The machine learning model represents what was learned by the machine learning algorithm and represents the rules, numbers, and any other algorithm-specific data structures required to for classification.

Software programming is a skilled activity where developers create source code scripts with functional code logic components based on specific requirements on various programming platforms within a distributed development platform (e.g., DevOps platform). As future software development moves to a distributed modality, source code scripts that are hosted on a cloud, are likely to be shared among multiple developers to create modular programs using various functional code logic components. However, individual contributions of developers who created the functional code logic components that are part of the program may go unrecognized in the grand scheme of things. With the ongoing digitalization of the world, non-fungible tokens (NFTs) are becoming a very viable solution for tokenizing ownership of digital resources. NFT technology can be leveraged to tokenize ownership of functional code logic components in a distributed development platform such that source code scripts may be shared in such a way that the developer's contribution is not only recognized, but also monetized. Therefore, there is a need for a system for detection and recordation of functional code logic components on a distributed development platform.

The present invention provides the functional benefit of, (i) using machine learning techniques to automatically identify unique and novel functional code logic components in a source code script based on predetermined factors such as reliability, maintainability, testability, portability, code defect analysis, code complexity analysis, code summary, and/or the like, and (ii) generating and recording on a distributed ledger, an NFT for each functional code logic component that is identified to attribute the functional code logic component to its corresponding developer and store smart contracts detailing the conditional requirements that need to be met to use the functional code logic component as part of a larger program.

FIG. 1 illustrates technical components of a system for detection and recordation of functional code logic components on a distributed development platform 100, in accordance with an embodiment of the invention. FIG. 1 provides a unique system that includes specialized servers and system communicably linked across a distributive network of nodes required to perform the functions of the process flows described herein in accordance with embodiments of the present invention.

As illustrated, the system environment 100 includes a network 110, a system 130, and a user input device 140. In some embodiments, the system 130, and the user input device 140 may be used to implement the processes described herein, in accordance with an embodiment of the present invention. In this regard, the system 130 and/or the user input device 140 may include one or more applications stored thereon that are configured to interact with one another to implement any one or more portions of the various user interfaces and/or process flow described herein.

In accordance with embodiments of the invention, the system 130 is intended to represent various forms of digital computers, such as laptops, desktops, video recorders, audio/video player, radio, workstations, servers, wearable devices, Internet-of-things devices, electronic kiosk devices (e.g., automated teller machine devices), blade servers, mainframes, or any combination of the aforementioned. In accordance with embodiments of the invention, the user input device 140 is intended to represent various forms of mobile devices, such as personal digital assistants, cellular telephones, smartphones, augmented reality (AR) devices, virtual reality (VR) devices, extended reality (XR) devices, and other similar computing devices. The components shown here, their connections and relationships, and their functions, are meant to be exemplary only, and are not meant to limit implementations of the inventions described and/or claimed in this document.

In accordance with some embodiments, the system 130 may include a processor 102, memory 104, a storage device 106, a high-speed interface 108 connecting to memory 104, and a low-speed interface 112 connecting to low speed bus 114 and storage device 106. Each of the components 102, 104, 106, 108, 111, and 112 are interconnected using various buses, and may be mounted on a common motherboard or in other manners as appropriate. The processor 102 can process instructions for execution within the system 130, including instructions stored in the memory 104 or on the storage device 106 to display graphical information for a GUI on an external input/output device, such as display 116 coupled to a high-speed interface 108. In other implementations, multiple processors and/or multiple buses may be used, as appropriate, along with multiple memories and types of memory. Also, multiple systems, same or similar to system 130 may be connected, with each system providing portions of the necessary operations (e.g., as a server bank, a group of blade servers, or a multi-processor system). In some embodiments, the system 130 may be a server managed by the business. The system 130 may be located at the facility associated with the business or remotely from the facility associated with the business.

The memory 104 stores information within the system 130. In one implementation, the memory 104 is a volatile memory unit or units, such as volatile random access memory (RAM) having a cache area for the temporary storage of information. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

In some embodiments, the system 130 may be configured to access, via the network 110, a number of other computing devices (not shown) in addition to the user input device 140. In this regard, the system 130 may be configured to access one or more storage devices and/or one or more memory devices associated with each of the other computing devices. In this way, the system 130 may implement dynamic allocation and de-allocation of local memory resources among multiple computing devices in a parallel or distributed system. Given a group of computing devices and a collection of interconnected local memory devices, the fragmentation of memory resources is rendered irrelevant by configuring the system 130 to dynamically allocate memory based on availability of memory either locally, or in any of the other computing devices accessible via the network. In effect, it appears as though the memory is being allocated from a central pool of memory, even though the space is distributed throughout the system. This method of dynamically allocating memory provides increased flexibility when the data size changes during the lifetime of an application and allows memory reuse for better utilization of the memory resources when the data sizes are large.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, display 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms, as shown in FIG. 1. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1 also illustrates a user input device 140, in accordance with an embodiment of the invention. The user input device 140 includes a processor 152, memory 154, an input/output device such as a display 156, a communication interface 158, and a transceiver 160, among other components. The user input device 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the user input device 140, including instructions stored in the memory 154. The processor may be implemented as a chipset of chips that include separate and multiple analog and digital processors. The processor may be configured to provide, for example, for coordination of the other components of the user input device 140, such as control of user interfaces, applications run by user input device 140, and wireless communication by user input device 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of user input device 140 with other devices. External interface 168 may provide, for example, for wired communication in some implementations, or for wireless communication in other implementations, and multiple interfaces may also be used.

The memory 154 stores information within the user input device 140. The memory 154 can be implemented as one or more of a computer-readable medium or media, a volatile memory unit or units, or a non-volatile memory unit or units. Expansion memory may also be provided and connected to user input device 140 through an expansion interface (not shown), which may include, for example, a SIMM (Single In Line Memory Module) card interface. Such expansion memory may provide extra storage space for user input device 140 or may also store applications or other information therein. In some embodiments, expansion memory may include instructions to carry out or supplement the processes described above and may include secure information also. For example, expansion memory may be provided as a security module for user input device 140 and may be programmed with instructions that permit secure use of user input device 140. In addition, secure applications may be provided via the SIMM cards, along with additional information, such as placing identifying information on the SIMM card in a non-hackable manner. In some embodiments, the user may use the applications to execute processes described with respect to the process flows described herein. Specifically, the application executes the process flows described herein.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer-or machine-readable medium, such as the memory 154, expansion memory, memory on processor 152, or a propagated signal that may be received, for example, over transceiver 160 or external interface 168.

In some embodiments, the user may use the user input device 140 to transmit and/or receive information or commands to and from the system 130 via the network 110. Any communication between the system 130 and the user input device 140 (or any other computing devices) may be subject to an authentication protocol allowing the system 130 to maintain security by permitting only authenticated users (or processes) to access the protected resources of the system 130, which may include servers, databases, applications, and/or any of the components described herein. To this end, the system 130 may require the user (or process) to provide authentication credentials to determine whether the user (or process) is eligible to access the protected resources. Once the authentication credentials are validated and the user (or process) is authenticated, the system 130 may provide the user (or process) with permissioned access to the protected resources. Similarly, the user input device 140 (or any other computing devices) may provide the system 130 with permissioned to access the protected resources of the user input device 130 (or any other computing devices), which may include a GPS device, an image capturing component (e.g., camera), a microphone, a speaker, and/or any of the components described herein.

The user input device 140 may communicate with the system 130 (and one or more other devices) wirelessly through communication interface 158, which may include digital signal processing circuitry where necessary. Communication interface 158 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 160. In addition, short-range communication may occur, such as using a Bluetooth, Wi-Fi, or other such transceiver (not shown). In addition, GPS (Global Positioning System) receiver module 170 may provide additional navigation—and location-related wireless data to user input device 140, which may be used as appropriate by applications running thereon, and in some embodiments, one or more applications operating on the system 130.

The user input device 140 may also communicate audibly using audio codec 162, which may receive spoken information from a user and convert it to usable digital information. Audio codec 162 may likewise generate audible sound for a user, such as through a speaker, e.g., in a handset of user input device 140. Such sound may include sound from voice telephone calls, may include recorded sound (e.g., voice messages, music files, etc.) and may also include sound generated by one or more applications operating on the user input device 140, and in some embodiments, one or more applications operating on the system 130.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software application, or code) include machine instructions for a programmable processor and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a technical environment that includes a back end component (e.g., as a data server), that includes a middleware component (e.g., an application server), that includes a front end component (e.g., a client computer having a graphical user interface or a Web browser through which a user can interact with an implementation of the systems and techniques described here), or any combination of such back end, middleware, or front end components.

As shown in FIG. 1, the components of the system 130 and the user input device 140 are interconnected using the network 110. The network 110, which may be include one or more separate networks, be a form of digital communication network such as a telecommunication network, a local area network ("LAN"), a wide area network ("WAN"), a global area network ("GAN"), the Internet, or any combination of the foregoing. It will also be understood that the network 110 may be secure and/or unsecure and may also include wireless and/or wired and/or optical interconnection technology.

In accordance with an embodiments of the invention, the components of the system environment 100, such as the system 130 and the user input device 140 may have a client-server relationship, where the user input device 130 makes a service request to the system 130, the system 130 accepts the service request, processes the service request, and returns the requested information to the user input device 140, and vice versa. This relationship of client and server typically arises by virtue of computer programs running on the respective computers and having a client-server relationship to each other.

It will be understood that the embodiment of the system environment 100 illustrated in FIG. 1 is exemplary and that other embodiments may vary. As another example, in some embodiments, the system environment may include more, fewer, or different components. As another example, in some embodiments, some or all of the portions of the system environment 100 may be combined into a single portion. Likewise, in some embodiments, some or all of the portions of the system 130 may be separated into two or more distinct portions.

FIG. 2 illustrates a process flow for detection and recordation of functional code logic components on a distributed development platform 200, in accordance with an embodiment of the invention. As shown in block 202, the process flow includes retrieving, from a source code repository, a source code script. Here, the source code script may include a set of instructions and statements written by a first user (developer) using a computer programming language. In this regard, the system may be configured to electronically receive, from a first user input device, the source code script. In response, the system may be configured to store the source code script in the source code repository. In some embodiments, the source code script may include functional code logic components that are a unique cluster of program instructions that perform a specific task and can be packaged as a unit. These functional code logic components may be identified as callable units within a specific program or be made available so that it can be used by users (e.g., second user) to develop other programs.

To identify functional code logic components in the source code script, the system may be configured to employ machine learning techniques. Here, machine learning algorithms may be used to analyze the source code script using component identification features such as reliability, maintainability, testability, portability, code defect analysis, code complexity analysis, code summary, quality analysis, code completion, code synthesis, and/or the like to not only identify functional code logic components, but also determine whether the functional code logic components meet the requisite standard to be deemed a callable unit.

Next, as shown in block 204, the process flow includes initiating a machine learning model on the source code script. As described herein, the machine learning model may refer to a mathematical model generated by machine learning algorithms based on training data, to make predictions or decisions without being explicitly programmed to do so. In some embodiments, the system may be configured to generate the machine learning model by implementing one or more machine learning algorithms capable of receiving an analyzing input data to predict output values within an acceptable range.

Next, as shown in block 206, the process flow includes determining, using the machine learning model, at least one functional code logic component from the source code script. To generate the machine learning model capable of determining functional code logic components in the source code script, the system may be configured to retrieve component identification feature values for known functional code logic components from the source code repository. These feature values form the training dataset for the machine learning model. Then, the system may be configured to train, using the machine learning algorithm, the machine learning model on these feature values. Once trained, the system may be configured to determine classification parameters for the machine learning model that are then used to analyze unseen source code scripts for functional code logic components. Each unseen source code script is analyzed using component identification features. For each component identification feature, the system may be configured to generate a feature value. These feature values are then used by the machine learning model to classify a specific cluster of code into a functional code logic component. Once the functional code logic component is identified, the system may be then be configured to leverage NFT technology to treat each functional code logic component as a potentially valuable digital resource for the first user.

Next, as shown in block 208, the process flow includes generating, using the NFT source code mapping engine, a NFT for the at least one functional code logic component. By generating an NFT for each functional code logic component, the system may be configured to memorialize the creativity of the first user and provide an opportunity for the first user to monetize the functional code logic component. Accordingly, the NFT for the functional code logic component may include resource descriptors such as a description of the functional code logic component, information associated with the first user, a value for the NFT, and/or the like. These resource descriptors may be stored in the many metadata layers of the NFT. While the description of the functional code logic component and the information associated with the first user may be retrieved from the functional code logic component itself, the value of the NFT may be determined using one or more attributes. In some embodiments, the attributes may include at least a security status level of the distributed ledger in which the NFT is recorded, metadata storage type, lifetime of the NFT, rarity of the functional code logic component, identification features of the functional code logic component, and/or the like. In some embodiments, the system may be configured to implement an NFT valuation engine that analyzes the various attributes to determine the value for the NFT.

In some embodiments, the functional code logic component may be associated with one or more code access conditions. The code access conditions may include one or more requirements that need to be met before the functional code logic component is accessible to other users. These code access conditions may be specified by the first user. In one example, the code access conditions may include licensing requirements specified by the first user for access and use of the functional code logic component by another user (e.g., second user) in a program. Such code access conditions may include a purchase value, use limits, transfer options, time period of use, integration restrictions (e.g., platform restrictions), and/or the like. These code access conditions may be recorded in the form of a smart contract and stored in the many metadata layers of the NFT.

Next, as shown in block 210, the process flow includes recording the NFT in a distributed ledger. In this regard, the system may be configured to generate a new transaction object (e.g., block) for the NFT. Each transaction object may include the NFT, a nonce—a randomly generated 32-bit whole number when the transaction object is created, and a hash value wedded to that nonce. Once generated, the NFT is considered signed and forever tied to its nonce and hash. Then, the system may be configured to deploy the new transaction object for the NFT on the distributed ledger. In some embodiments, when new transaction object is deployed on the distributed ledger, a distributed ledger address is generated for that new transaction object, i.e., an indication of where it is located on the distributed ledger. This distributed ledger address is captured for recording purposes. In some embodiments, in response to recording the NFT in the distributed ledger, each functional code logic component in the source code script is tagged with a code descriptor indicating that the functional code logic component is associated with an NFT. In this regard, the code descriptor may include the distributed ledger address for the transaction object associated with that functional code logic component. Once the functional code logic components are tagged, the source code scripts are then updated in the source code repository.

In some embodiments, the system may be configured to receive, from a second user input device (of a second user), a request to access the at least one functional code to be integrated into a program. Here, the at least one functional code has been tagged with the code descriptor indicating that the functional code logic component is associated with an NFT. In response, the system may be configured to retrieve, from the second metadata layer of the NFT, the code access conditions associated with the at least one functional code logic component. The system may then be configured to transmit control signals configured to cause the second user input device to display the code access conditions for user review. In response, the system may be configured to electronically receive, from the second user input device, a second user input acknowledging the code access conditions. Then, the system may be configured to retrieve, from the third metadata layer of the NFT, the value of the NFT, and in response, automatically retrieve, from an account repository (e.g., financial account) associated with the second user, an amount of funds corresponding to the value of the NFT. Once the funds are retrieved, the system may be configured to authorize the second user input device to access the at least one functional code logic component. The extent of this access is based on at least the code access conditions that were previously acknowledged by the second user.

In some embodiments, the second user, in response to building the program, may decide to generate an NFT for the program. Since the program was developed using the at least one functional code logic component, the NFT for the program is now a containerized NFT, which includes the NFT for the at least one functional code logic component. Accordingly, the system may be configured to electronically receive, from the user input device, a request to generate a containerized NFT for the program. In response, the system may be configured to generate, using the NFT source code mapping engine, the containerized NFT for the program, wherein the containerized NFT comprises at least the NFT associated with the at least one functional code logic component. In response to generating the containerized NFT for the program, the system may be configured to record the containerized NFT in the distributed ledger.

FIG. 3 illustrates a data flow diagram for detection and recordation of functional code logic components on a distributed development platform 300, in accordance with an embodiment of the invention. As shown in FIG. 3, the data flow diagram includes a source code repository 302, a functional code logic component identification engine 304, functional code logic components (FCLC) 306 identified by the functional code logic component identification engine 304, an NFT source code mapping engine 308, an NFT recordation step 310, and a source code script tagging step 312.

Any new source code script received at the source code repository 302 is immediately retrieved for analysis by the functional code logic component identification engine 304 using machine learning based source code analysis where component identification features of the unseen source code script are analyzed. Based on this analysis, FCLC_1, FCLC_2, . . . , FCLC_n are identified and fed into the NFT source code mapping engine 308. The NFT source code mapping engine 308 generates an NFT for each FCLC, i.e., NFT for FCLC_1, NFT for FCLC_2, . . . , NFT for FCLC_n. These NFTs are then recorded in at step 310 in the distributed ledger. Once recorded, each FCLC in the source code script is then tagged with code descriptors indicating that the FCLC is associated with an NFT. As described herein, the code descriptor may include the distributed ledger address for the transaction object associated with that FCLC. Once the FCLCs in the source code script are tagged, the source code scripts are then updated in the source code repository 302.

As described herein, to identify functional code logic components from a source code script, the present invention: (i) retrieves, from a source code repository, a source code script. The source code script may include a set of instructions and statements written by a first user (developer), (ii) initiates a machine learning model on the source code script to identify functional code logic components in the source code script. Functional code logic components are a unique cluster of program instructions that perform a specific task and can be packaged as a unit. The source code script is analyzed using component identification features (e.g., code reliability, maintainability, testability, portability, code defect analysis, code complexity analysis, etc.) to identify functional code logic components, (iii) determines, using the machine learning model, functional code logic component in the source code script. Trains the machine learning model using component identification features extracted from known functional code components, (iv) displays the functional code logic components identified in the source code script to the user, and (v) receives code access conditions, i.e., requirements that need to be met before the functional code logic component is accessible to other users, from the first user.

As described herein, to generate an NFT for the functional code logic components, the present invention, (i) Generates, using the NFT source code mapping engine, a NFT for the at least one functional code logic component. NFT includes resource descriptors such as a description of the functional code logic component, code access conditions, information associated with the first user, a value for the NFT, and/or the like, (ii) records the NFT in the distributed ledger, (iii) tags the functional code logic component with a code descriptor indicating that the functional code logic component is associated with an NFT, and (iv) updates the source code script with the tagged functional code logic components in the source code repository.

As described herein, to generate a containerized NFT for a program that uses the functional code logic components that are already associated with an NFT, the present invention, (i) receives, from a second user input device (of a second user), a request to access the functional code to be integrated into a program, (ii) retrieves, from the second metadata layer of the NFT, the code access conditions associated with the functional code logic component, (iii) displays the code access conditions for user review, (iv) receives, from the second user input device, a second user input acknowledging the code access conditions, (v) retrieves, from the third metadata layer of the NFT, the value of the NFT, (vi) retrieves, from an account repository (e.g., financial account) associated with the second user, an amount of funds corresponding to the value of the NFT, (vii) authorizes the second user input device to access the at least one functional code logic component, (viii) receives, from the user input device, a request to generate a containerized NFT for the program, (ix) generates, using the NFT source code mapping engine, the containerized NFT for the program. The containerized NFT includes the NFT associated with the functional code logic component that was used in the program, and (x) records the containerized NFT in the distributed ledger.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for detection and recordation of functional code logic components on a distributed development platform, the system comprising:
    one or more memory devices having computer readable code stored thereon;

one or more processing devices operatively coupled to the one or more memory devices, wherein the one or more processing devices are configured to execute the computer readable code to:
    retrieve, from a source code repository, a source code script, wherein the source code script is associated with a first source;
    initiate a machine learning model on the source code script;
    determine, using the machine learning model, at least one functional code logic component from the source code script;
    initiate an NFT source code mapping engine on the at least one functional code logic component;
    generate, using the NFT source code mapping engine, a NFT for the at least one functional code logic component, wherein the NFT comprises the at least one functional code logic component and information associated with the first source; and
    store the NFT in a non-transitory storage device.

2. The system of claim 1, wherein storing the NFT further comprises:
    storing the NFT in a distributed ledger;
    generating a new transaction object for the NFT; and
    deploying the new transaction object on the distributed ledger.

3. The system of claim 1, wherein the one or more processing devices are further configured to execute the computer readable code to:
    generate, using the NFT source code mapping engine, a first metadata layer for the NFT; and
    store the functional code logic component and information associated with the first source in the first metadata layer.

4. The system of claim 1, wherein the one or more processing devices are further configured to execute the computer readable code to:
    electronically receive, from a first source input device, the source code script; and
    store the source code script in the source code repository in response to receiving the source code script.

5. The system of claim 4, wherein the one or more processing devices are further configured to execute the computer readable code to:
    transmit control signals configured to cause the first source input device to display the at least one functional code logic component; and
    in response, electronically receive, from the first source input device, one or more code access conditions associated with the at least one functional code logic component.

6. The system of claim 5, wherein the one or more processing devices are further configured to execute the computer readable code to:
    generate, using the NFT source code mapping engine, a second metadata layer for the NFT; and
    store the one or more code access conditions in the second metadata layer.

7. The system of claim 6, wherein the one or more processing devices are further configured to execute the computer readable code to:
    electronically receive, from a second source input device, a request to access the at least one functional code to be integrated into a program;
    retrieve, from the second metadata layer of the NFT, the one or more code access conditions; and
    transmit control signals configured to cause the second source input device to display the one or more code access conditions.

8. The system of claim 7, wherein the one or more processing devices are further configured to execute the computer readable code to:
    electronically receive, from the second source input device, a second source input acknowledging the one or more code access conditions;
    retrieve, from a third metadata layer of the NFT, a value of the NFT;
    automatically retrieve, from an account repository associated with the second source, an amount of funds corresponding to the value of the NFT; and
    in response, authorize the second source input device to access the at least one functional code logic component.

9. The system of claim 8, wherein the one or more processing devices are further configured to execute the computer readable code to:
    electronically receive, from the second source input device, a request to generate a containerized NFT for the program;
    generate, using the NFT source code mapping engine, the containerized NFT for the program, wherein the containerized NFT comprises at least the NFT associated with the at least one functional code logic component; and
    store the containerized NFT in the non-transitory storage device.

10. A computer program product for detection and recordation of functional code logic components on a distributed development platform, the computer program product comprising a non-transitory computer-readable medium comprising code causing a first apparatus to:
    retrieve, from a source code repository, a source code script, wherein the source code script is associated with a first source;
    initiate a machine learning model on the source code script;
    determine, using the machine learning model, at least one functional code logic component from the source code script;
    initiate an NFT source code mapping engine on the at least one functional code logic component;
    generate, using the NFT source code mapping engine, a NFT for the at least one functional code logic component, wherein the NFT comprises the at least one functional code logic component and information associated with the first source; and
    store the NFT in a non-transitory storage device.

11. The computer program product of claim 10, wherein storing the NFT further comprises:
    storing the NFT in a distributed ledger;
    generating a new transaction object for the NFT; and
    deploying the new transaction object on the distributed ledger.

12. The computer program product of claim 10, wherein the first apparatus is further configured to:
    generate, using the NFT source code mapping engine, a first metadata layer for the NFT; and
    store the functional code logic component and information associated with the first source in the first metadata layer.

13. The computer program product of claim 10, wherein the first apparatus is further configured to:

electronically receive, from a first source input device, the source code script; and store the source code script in the source code repository in response to receiving the source code script.

14. The computer program product of claim 13, wherein the first apparatus is further configured to:

transmit control signals configured to cause the first source input device to display the at least one functional code logic component; and in response, electronically receive, from the first source input device, one or more code access conditions associated with the at least one functional code logic component.

15. The computer program product of claim 14, wherein the first apparatus is further configured to:

generate, using the NFT source code mapping engine, a second metadata layer for the NFT; and store the one or more code access conditions in the second metadata layer.

16. The computer program product of claim 15, wherein the first apparatus is further configured to:

electronically receive, from a second source input device, a request to access the at least one functional code to be integrated into a program;

retrieve, from the second metadata layer of the NFT, the one or more code access conditions; and transmit control signals configured to cause the second source input device to display the one or more code access conditions.

17. The computer program product of claim 16, wherein the first apparatus is further configured to:

electronically receive, from the second source input device, a second source input acknowledging the one or more code access conditions;

retrieve, from a third metadata layer of the NFT, a value of the NFT;

automatically retrieve, from an account repository associated with the second source, an amount of funds corresponding to the value of the NFT; and in response, authorize the second source input device to access the at least one functional code logic component.

18. A method for detection and recordation of functional code logic components on a distributed development platform, the method comprising:

retrieving, from a source code repository, a source code script, wherein the source code script is associated with a first source;

initiating a machine learning model on the source code script;

determining, using the machine learning model, at least one functional code logic component from the source code script;

initiating an NFT source code mapping engine on the at least one functional code logic component;

generating, using the NFT source code mapping engine, a NFT for the at least one functional code logic component, wherein the NFT comprises the at least one functional code logic component and information associated with the first source; and storing the NFT in a non-transitory storage device.

19. The method of claim 18, wherein storing the NFT further comprises:

storing the NFT in a distributed ledger;

generating a new transaction object for the NFT; and deploying the new transaction object on the distributed ledger.

20. The method of claim 18, wherein the method further comprises:

generating, using the NFT source code mapping engine, a first metadata layer for the NFT; and storing the functional code logic component and information associated with the first source in the first metadata layer.

* * * * *